(12) United States Patent
Mamigonians

(10) Patent No.: US 8,994,383 B2
(45) Date of Patent: Mar. 31, 2015

(54) METHOD AND SENSOR FOR SENSING THE ELECTRICAL PERMITTIVITY OF AN OBJECT

(75) Inventor: Hrand Mami Mamigonians, London (GB)

(73) Assignee: HM Technology International Limited, Harrow, Middlesex (GB)

( * ) Notice: Subject to any disclaimer, the term of this patent is extended or adjusted under 35 U.S.C. 154(b) by 405 days.

(21) Appl. No.: 13/410,764

(22) Filed: Mar. 2, 2012

(65) Prior Publication Data

US 2012/0223723 A1 Sep. 6, 2012

(30) Foreign Application Priority Data

| Mar. 4, 2011 | (GB) | 1103759.5 |
| Jul. 4, 2011 | (GB) | 1111403.0 |
| Dec. 9, 2011 | (GB) | 1121242.0 |

(51) Int. Cl.
| G01R 27/28 | (2006.01) |
| G01L 1/14 | (2006.01) |
| G01L 5/16 | (2006.01) |
| B60N 2/00 | (2006.01) |

(52) U.S. Cl.
CPC ............... *G01L 1/142* (2013.01); *G01L 1/146* (2013.01); *G01L 5/165* (2013.01); *B60N 2/002* (2013.01)
USPC ........................................................ 324/649

(58) Field of Classification Search
None
See application file for complete search history.

(56) References Cited

U.S. PATENT DOCUMENTS

| 5,373,245 A | 12/1994 | Vranish |
| 2006/0012944 A1 | 1/2006 | Mamigonians |
| 2006/0119369 A1 | 6/2006 | Kawahata et al. |
| 2008/0173105 A1 | 7/2008 | Wang et al. |
| 2009/0158856 A1 | 6/2009 | Harish et al. |
| 2010/0024573 A1 | 2/2010 | Daverman et al. |
| 2010/0295814 A1 | 11/2010 | Kent et al. |

FOREIGN PATENT DOCUMENTS

| EP | 1653206 A2 | 5/2006 |
| KR | 1020100044384 | 4/2010 |

OTHER PUBLICATIONS

Cui, Z. et al, Image reconstruction for field-focusing capacitance imaging, Meas. Sci. Technol, 22 (2011), 035501 (9 pp), Feb. 15, 2011.
Chen et al, Image reconstruction for an electrical capacitance tomography system based on a least-squares support vector machine and a self-adaptive particle swarm optimization algorithm, Sep. 9, 2011.

*Primary Examiner* — Jermele M Hollington
(74) *Attorney, Agent, or Firm* — Arthur Jacob

(57) ABSTRACT

The invention disclosed enables sensing of the electrical permittivity of an object. A sensor is provided that includes a dielectric layer that presents a surface defining the base of a volume in which a test object may be placed and an electrically active layer beneath the dielectric layer, comprising a first set of electrodes that extend in a first direction and a second set of electrodes that extend in a second direction that is perpendicular to the first direction. By applying a signal to a first electrode in said first set of electrodes, an electric field is generated that extends outside of the sensor. An output signal is then produced in each of the second electrode set by capacitive coupling to the first electrode. The electrical permittivity of the volume above the first receiver electrode is then determined based on the output signals in the said set of electrodes.

20 Claims, 16 Drawing Sheets

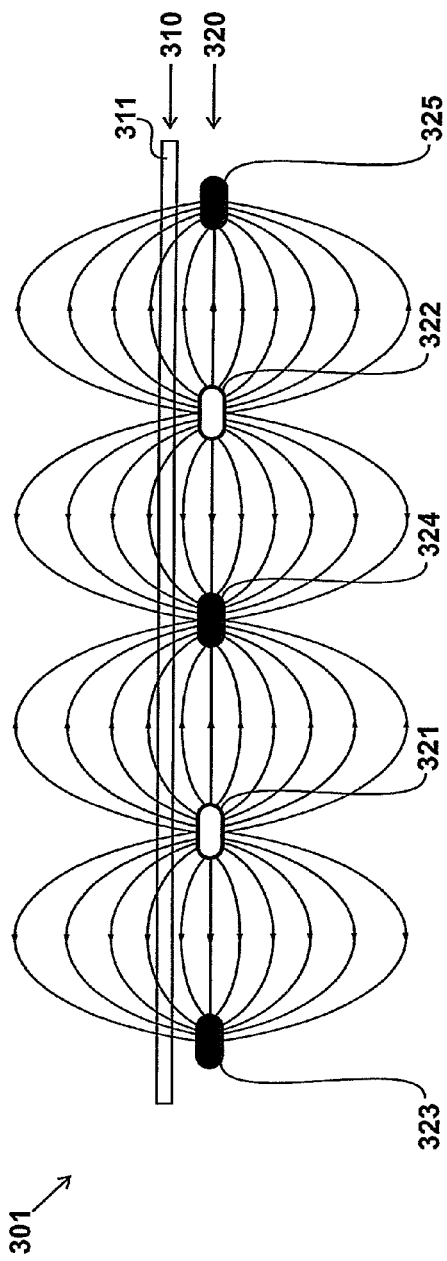
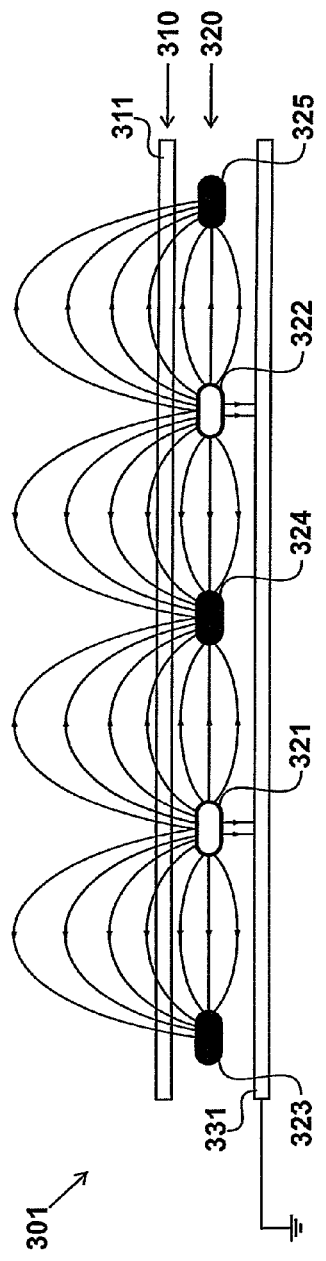
Figure 5A
Figure 5B

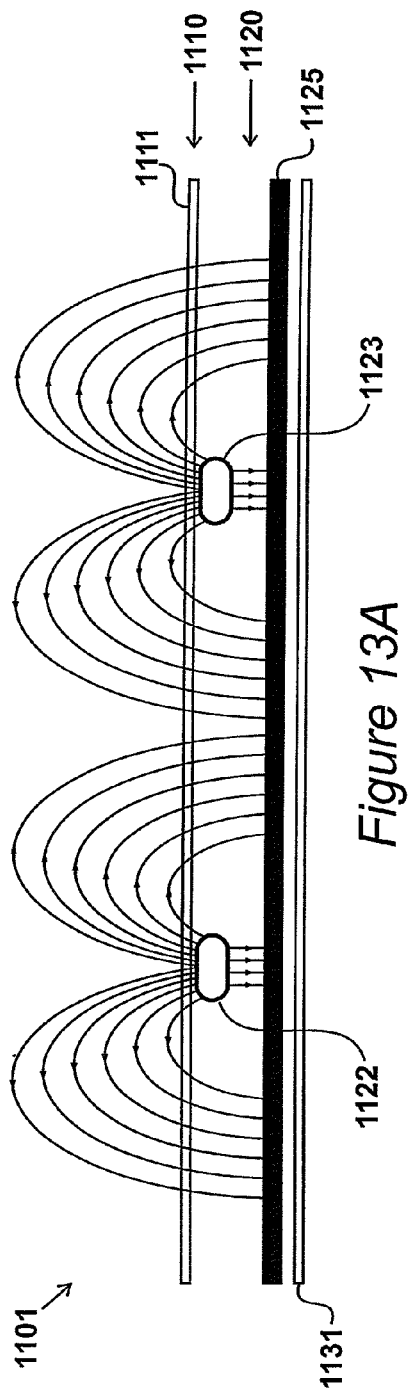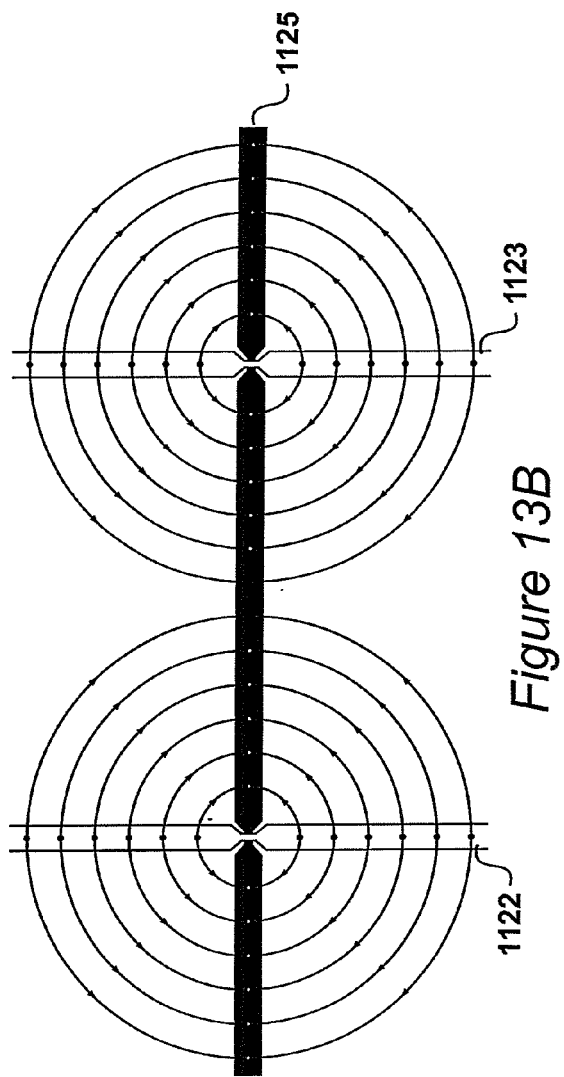

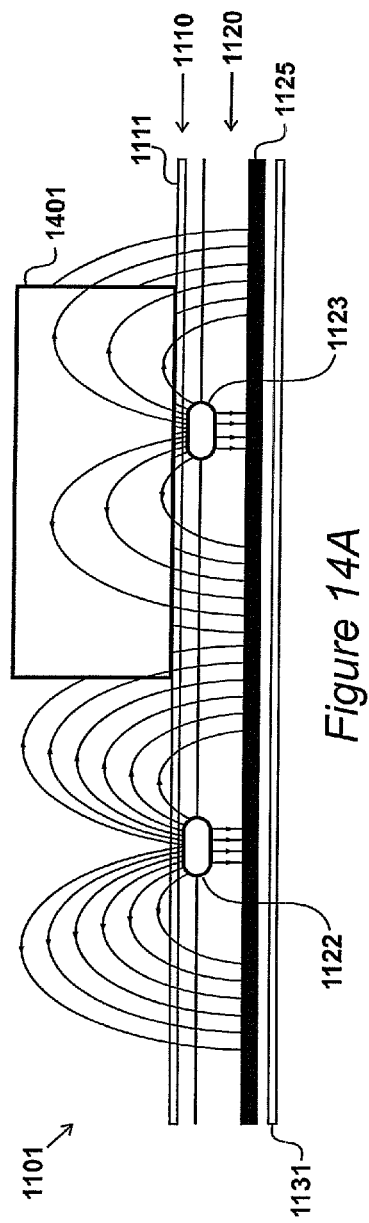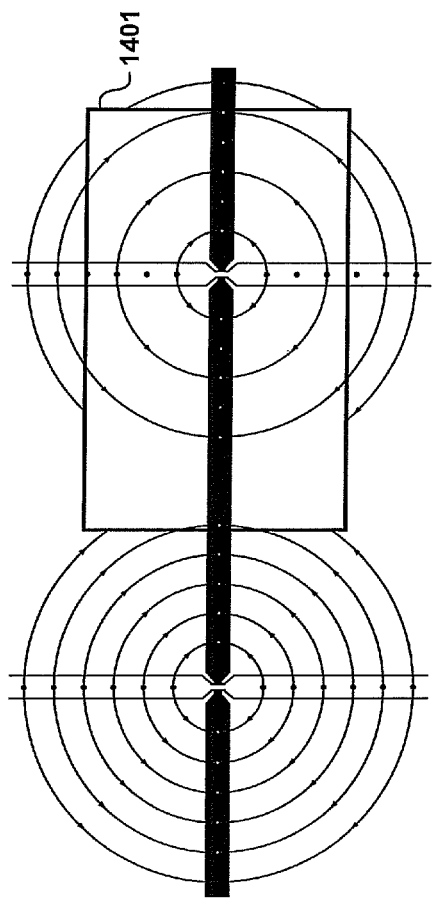
Figure 14A
Figure 14B

METHOD AND SENSOR FOR SENSING THE ELECTRICAL PERMITTIVITY OF AN OBJECT

CROSS REFERENCE TO RELATED APPLICATIONS

This application claims priority from United Kingdom Patent Application No. 11 03 759.5, filed Mar. 4, 2011, United Kingdom Patent Application No. 11 11 403.0, filed Jul. 4, 2011, and United Kingdom Patent Application No. 11 21 242.0, filed Dec. 9, 2011, whose contents are incorporated herein by reference in their entirety.

BACKGROUND OF THE INVENTION

1. Field of the Invention

The present invention relates to a method of sensing the electrical permittivity of an object and a sensor for the same.

2. Description of the Related Art

Capacitive-type sensing devices are well known in the art. Traditionally, such sensors are used to simply infer the presence of an object on such a sensor, an example of which may be found in touch screen devices. Little research and development, however, has been conducted into the use of these types of sensor arrays and how they may be utilised to not only infer the position of an object placed upon the sensor, but also to interrogate the object for electrical properties as well, in particular its electrical permittivity.

BRIEF SUMMARY OF THE INVENTION

According to an aspect of the present invention, there is provided a method of sensing the electrical permittivity of an object, comprising steps of: providing a sensor array including: a dielectric layer that presents a surface defining the base of a volume in which a test object may be placed, and an electrically active layer beneath said dielectric layer, comprising a first set of electrodes that extend in a first direction and a second set of electrodes that extend in a second direction that is perpendicular to said first direction; placing a test object in said volume; producing and applying an input signal to a first electrode in said first set of electrodes, thereby generating an electric field that extends outside of said sensor array; and detecting output signals produced in each one of said second set of electrodes that intersect said first transmitter electrode, wherein said output signals are caused by capacitive coupling between said first electrode and each one of said second set of electrodes, and wherein said output signals are indicative of the electrical permittivity in the volume above the intersection of said first electrode and each one of said second set of electrodes.

According to another aspect of the present invention, there is provided a sensor for sensing the electrical permittivity of an object placed thereon, said sensor including: a dielectric layer that presents a surface defining the base of a volume in which a test object may be placed; and an electrically active layer beneath said dielectric layer, comprising a first set of electrodes that extend in a first direction and a second set of electrodes that extend in a second direction that is perpendicular to said first direction; a signal generator configured to apply a signal to a first electrode in said first set of electrodes, thereby generating an electric field that extends outside of said sensor array; a signal detector configured to detect output signals in each one of said second set of electrodes that intersect said first transmitter electrode, wherein said output signals are caused by capacitive coupling between said first electrode and each one of said second set of second electrode; and a processor configured to determine the electrical permittivity of the volume above the first receiver electrode based on said output signals in each one of said second set of electrodes.

According to a further aspect of the present invention, there is provided a sensor for sensing the electrical permittivity of an object placed thereon, said sensor including: a dielectric layer that presents a surface defining the base of a volume in which a test object may be placed; and a first electrically active layer beneath said dielectric layer, comprising a first electrode set having alternating transmitter electrodes and receiver electrodes that extend in a first direction; a signal generator configured to apply a signal to a first transmitter electrode, thereby causing the generation of an electric field that extends outside of said sensor at a degree determined by the magnitude of the applied voltage; a signal detector configured to detect an output signal in a first receiver electrode caused by capacitive coupling with said first transmitter electrode; and a processor configured to determine the electrical permittivity of the volume above the first receiver electrode based on said output signal in said first receiver electrode.

BRIEF DESCRIPTION OF THE DRAWINGS

FIGS. 5A and 5B show the electric field formed within a portion of a sensor array 301;

FIGS. 13A and 13B show the electric field inside a portion of sensor array 1101;

FIGS. 14A and 14B shows the electric field in side a portion of sensor array 1101 when an object is placed on it;

DETAILED DESCRIPTION OF EXAMPLE EMBODIMENTS

FIG. 1

Figure 1:
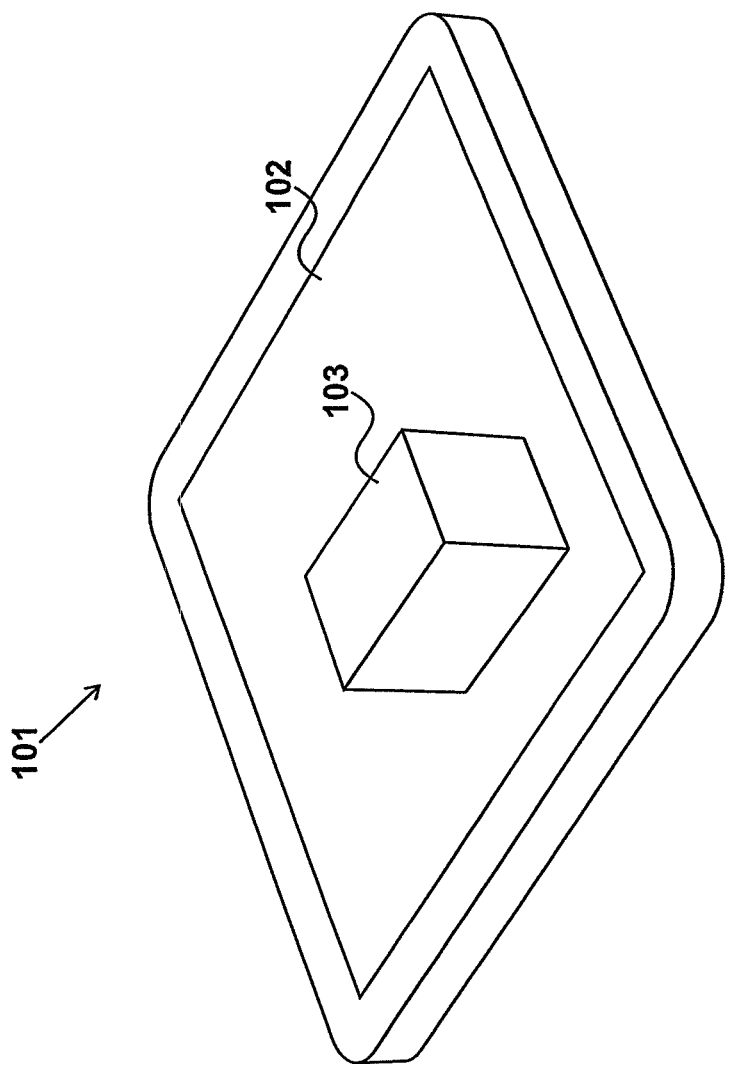
FIG. 1 shows a sensor 101 embodying an aspect of the present invention.

A sensor 101 embodying an aspect of the present invention is illustrated in FIG. 1.

Sensor 101 presents a surface 102 upon which an object may be applied. Surface 102 defines the base of a volume in which a test object may be placed. In the example shown in the Figure, an object 103 is positioned upon surface 102, and is composed of a medium such as wood. Due to the configuration of sensor 101, which will be described with reference to the later Figures, the electrical permittivity of object 103 can be interrogated and its properties found. Of course, whilst the sensor illustrated in the Figure shows an object being placed upon it, it is well within the scope of the principles of the present invention for a sensor to be produced that is sized such that it can be placed upon an object instead.

It will be appreciated that the particular shape of object 103 is, in this example, a simple cuboid in order to simplify the description of the present invention. However, the present applicant has conducted numerous trials of various shapes of object and materials; and it has, through this research, been established that the present invention is capable of determining both the profile and the electrical permittivity of objects placed upon the sensor, said objects being composed of either conductive, non-conductive or semi-conductive materials. Further, the research has concluded that even the presence of gas or liquid can be sensed—it will be therefore appreciated that the term "object" refers to anything placed on the sensor.

It is therefore envisaged that the principles embodied by the present invention will lend themselves well to shape recognition and even to diagnosis of conditions that affect the properties of human tissue, such as arthritis, due to their effect on the electrical properties of the tissue. In addition, the present invention allows the sensing of variances in electrical permittivity across the surface of or within an object placed on the sensor.

FIG. 2

Figure 2:
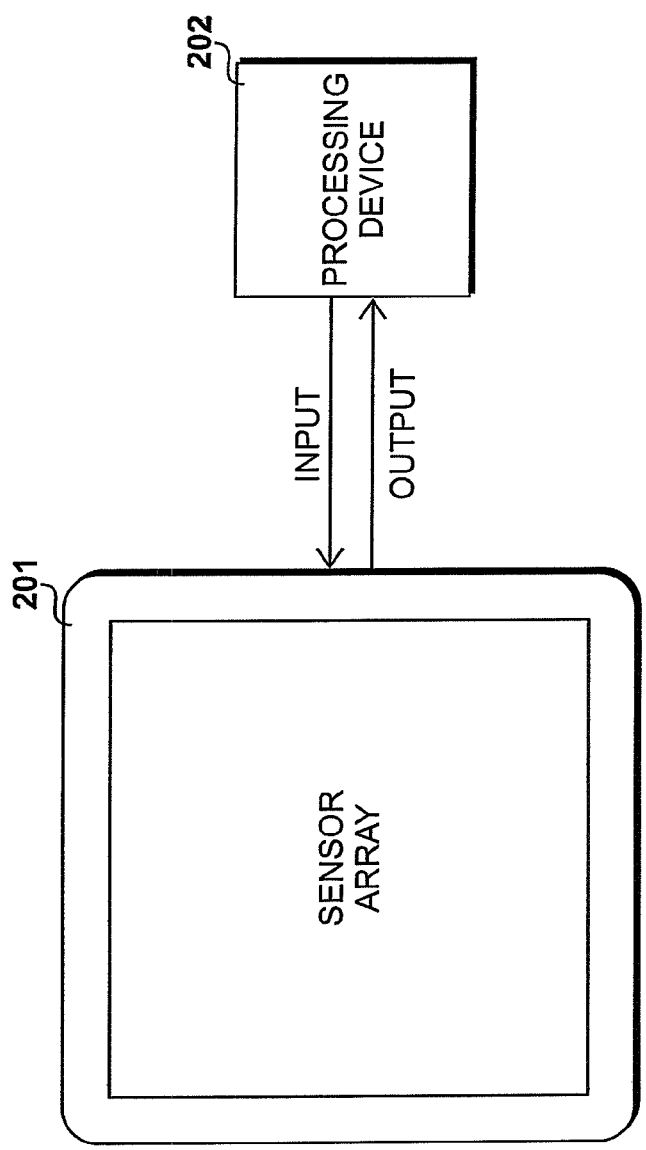
FIG. 2 shows a block diagram of components that provide the functionality of sensor 101.

A block diagram of components that provide the functionality of sensor 101 is shown in FIG. 2.

Sensor 101 comprises a sensor array 201, which provides substantially the core functionality of the present invention. Sensor array 201 is accompanied by a processing device 202, which provides input signals to sensor array 201, and detects and processes output signals to provide data indicating the electrical permittivity of numerous points in the volume defined above surface 102.

According to a first exemplary embodiment of the present invention, sensor 101 provides sensing of the electrical permittivity of the volume above surface 102 in one direction. The way in which a sensor configured according to this first embodiment will be described further with reference to FIGS. 3 to 10.

In addition, in accordance with a second exemplary embodiment of the present invention, sensor 101 provides sensing of the electrical permittivity of the volume in two substantially mutually orthogonal directions. The way in which a sensor configured according to this second embodiment will be described further with reference to FIGS. 11 to 16.

FIG. 3

Figure 3:
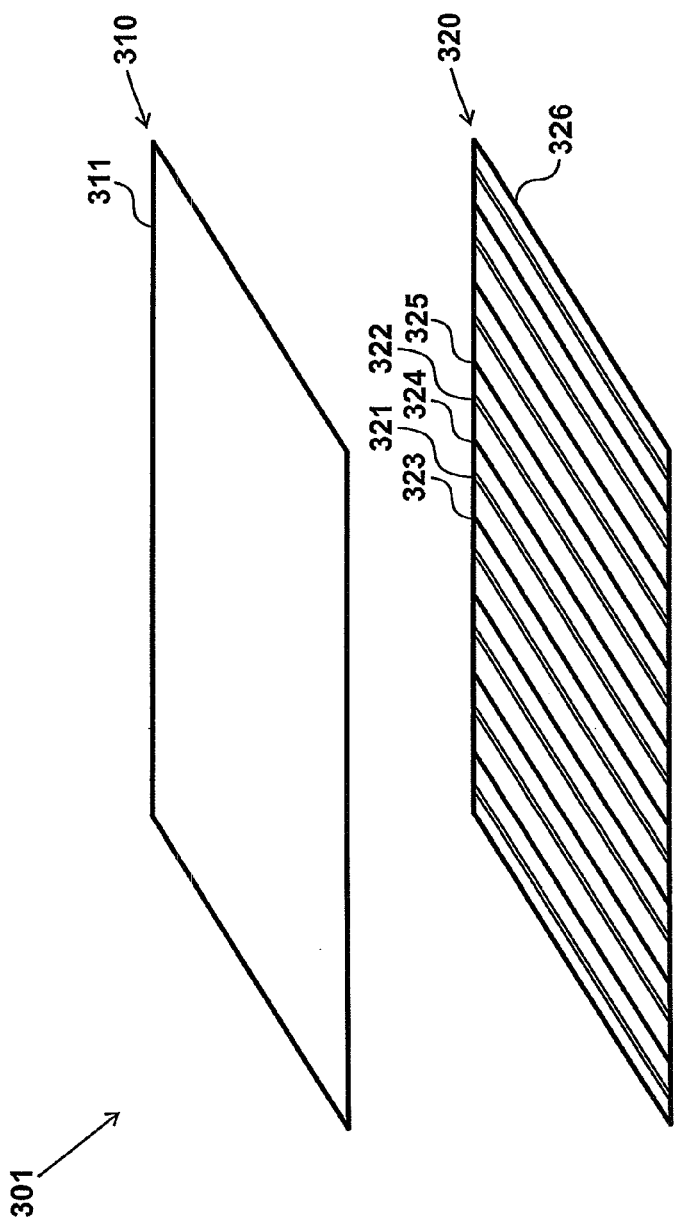
FIG. 3 shows an abstraction diagram of the structure of a sensor array configured in accordance with a first embodiment of the present invention.

An abstraction diagram of the structure of a sensor array configured in accordance with a first embodiment of the present invention is shown in FIG. 3. Sensor array 301, providing substantially the function of sensor array 201, comprises, in this example, two layers.

A dielectric layer 310 is present, which includes a sheet of dielectric material 311. Dielectric material 311 provides a surface upon which a test object may be placed. In an embodiment, dielectric material 311 is flexible so as to allow the layer to flex if required. In another embodiment, dielectric material 311 is transparent polyester, or could alternatively be transparent polyamide. Glass could also be used.

An electrically active layer 320 is also present, and is positioned beneath dielectric layer 310. Electrically active layer 320 comprises a first electrode set having a plurality of transmitter electrodes, such as transmitter electrodes 321 and 322, and a plurality of receiver electrodes, such as receiver electrodes 323, 324 and 325. The convention of representing transmitter electrodes with a white fill, and receiver electrodes with a black fill will be adhered to throughout the accompanying drawings. As can be seen in the Figure, the type of electrode alternates as one moves from right to left. Each of the transmitter electrodes is configured to capacitively couple to at least one receiver electrode.

In an example, the transmitter electrodes and the receiver electrodes comprise of conductive ink printed onto respective sides of a single membrane 326, which is a dielectric. Alternatively, the electrodes can be printed onto the same side of a single membrane, with appropriate modification of printing patterns to avoid short circuits. In a further alternative arrangement, electrically active layer 320 comprises of two membranes (each again being dielectric), with the transmitter electrodes being printed onto one membrane and the receiver electrodes being printed onto the other.

In an embodiment, membrane 326 is a flexible dielectric material, so as to allow the sensor array to flex and conform to non-flat surfaces requiring testing. In another embodiment, membrane 326 comprises of a suitable transparent material such as polyester. In such a case, it is also possible for the ink forming the transmitter electrodes and the receiver electrodes to be transparent as well. Suitable inks comprise of indium tin oxide, or alternatively graphene. In such an embodiment, along with the configuration of dielectric layer 310 to be transparent too, the entire sensor array will be transparent, allowing it to be placed over some form of image or a display, for example.

On application of a voltage to a transmitter electrode, an electric field forms which both extends outside of the sensor array and which causes capacitive coupling to other receiver electrodes in close proximity. The capacitive coupling between the electrodes will be described further with reference to FIGS. 5 and 6. It is also important to note that the degree to which the electric field extends outside of the surface of the sensor is dependent upon the magnitude of the voltage applied to transmitter electrodes. Thus, a higher voltage will, whilst clearly consuming more power, allow larger objects to be interrogated.

FIG. 4

Figure 4:
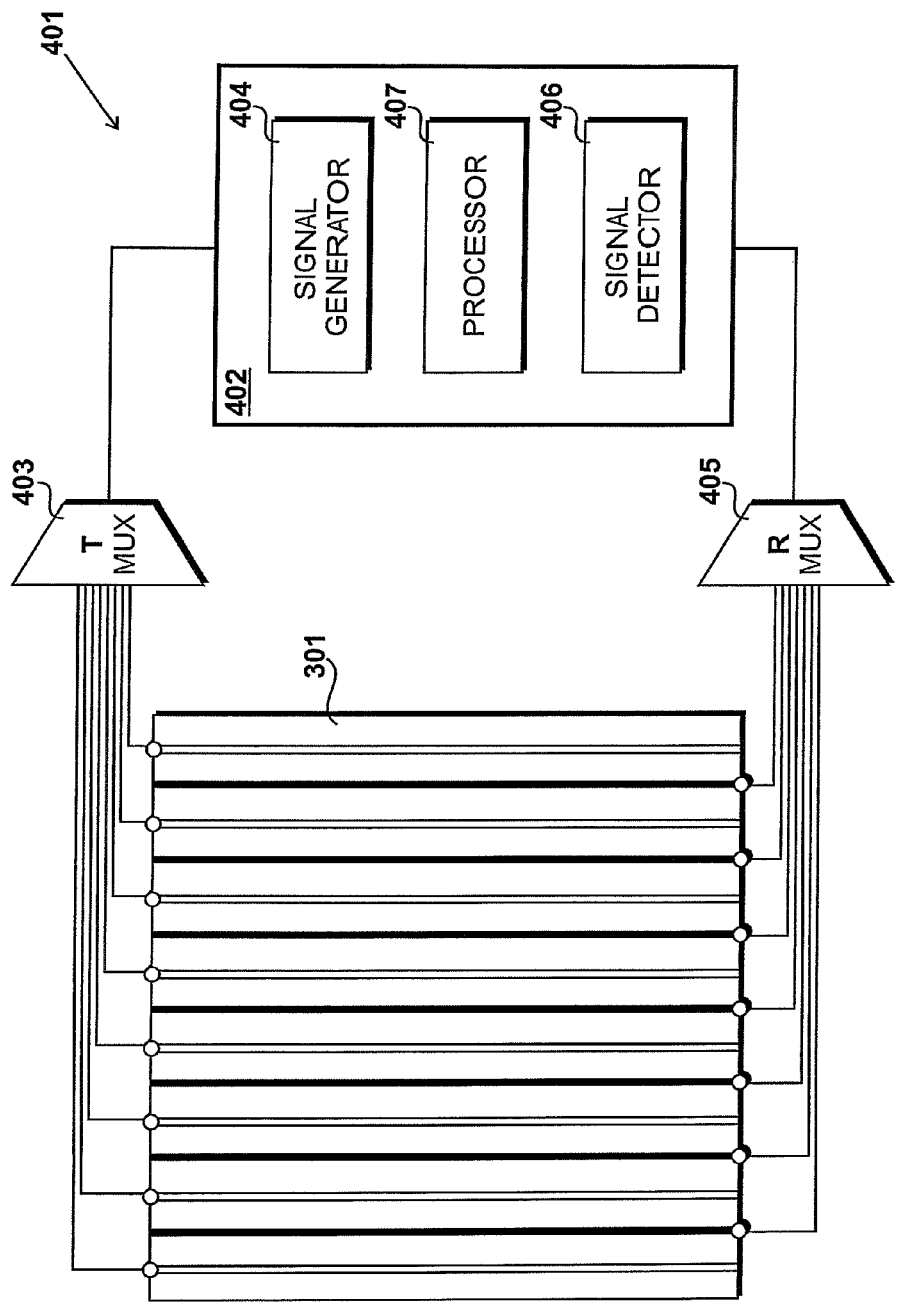
FIG. 4 shows a more detailed illustration of a sensor array 301.

A more detailed illustration of sensor array 301 when part of a sensor 401 illustrated in FIG. 2 is shown in FIG. 4.

As shown in the Figure, sensor array 301 is electrically connected via a pair of multiplexers to processing device 402 (fulfilling the role of processing device 202). A transmitter multiplexer 403 multiplexes input signals from a signal generator 404 within processing device 402 across each of the transmitter electrodes. A receiver multiplexer 405 multiplexes output signals from each receiver electrode into a signal detector 406.

In the present embodiment, signal generator 404 produces input signals, which, in an example, are square waves. Alternative waveforms, such as saw-tooths or sine waves, could be used depending upon the requirements of the sensor. The input signals are produced with reference to resolution of the clock (not shown) of a processor 407, which, in this example, has a frequency of ten Megahertz. A multiple, say 1 Kilohertz, of this base resolution is defined as f, and signal generator 404 produces input signals at a rate of repetition $2f$ (f multiplied by two). Transmitter multiplexer 403 multiplexes these input signals in sequence and at a rate f, thus resulting in two input signals being applied to each transmitter electrode. Receiver multiplexer 405 is also configured to multiplex output signals from the receiver electrodes at a rate f, albeit 180 degrees out of phase with transmitter multiplexer 403. The result of this multiplexing of input and output signals will be described further with reference to FIGS. 9 and 10. In addition, the operation of signal detector 404 will also be described further, with reference to FIG. 7.

Whilst illustrated in the Figure as part of processing device 402, and possibly communicating over and internal bus, it will be appreciated that, in some embodiments, each one of signal generator 404, signal detector 406 and processor 407 could be separate devices either connected by data cables using the RS-232 or USB standards, or by a radio-based data transmission system such as Bluetooth®. Thus, in an embodiment, signals detected by signal detector 404 are encoded into radio transmission packets by a radio transmitter (not shown) within signal detector 406, which are then received by a radio receiver (not shown) within processor 407 which are then decoded and processed accordingly. In addition, in an embodiment, processor 407 also includes a radio transmitter (not shown) for transmitting processed data to a data logging system, for example.

FIGS. 5A and 5B

The electric field formed within a portion of sensor array 301 when a voltage is applied to transmitter electrodes 321 and 322 is shown in cross-sectional view in FIG. 5A.

As can be seen in the Figure, upon application of a voltage to a transmitter electrode, such as transmitter electrode 321, an electric field is generated which, due to receiver electrodes also being conductive, results in capacitance arising between neighbouring electrodes. As illustrated, directly between a transmitter electrode and a receiver electrode, three flux lines are present which can essentially be modelled as similar to the type of flux that is present between the two plates in a parallel-plate capacitor. As this portion of the electric field is below dielectric material 311, upon which objects are placed, it will not be affected by changes in the electrical permittivity of the volume above the receiver electrode. However, it can also be seen that, due to the degree of voltage applied to transmitter electrode 321, the electric field formed also extends outside of the sensor and into the volume above dielectric material 311. This portion of the electric field also contributes to the capacitive coupling between the transmitter and receiver electrodes, but unlike the portion mentioned previously lying below dielectric material 311, it is susceptible to changes due to the electrical permittivity of the volume through which it passes. The presence of this fringe capacitance enables the present invention to interrogate the volume above the top surface of the sensor for its electrical properties, namely the electrical permittivity. As will be appreciated by those skilled in the science, the capacitance between two conductors is dependent upon the electrical permittivity of the volume between them. Thus, the present invention provides a method of analysing the capacitance between transmitter and receiver electrodes, which is then indicative of the electrical permittivity of the volume above the electrodes under measurement.

Indeed, it has been realised through extensive research by the present applicant that, the type of electrical permittivity sensed by a sensor in accordance with the present invention is in fact the complex permittivity. As will be appreciated by those skilled in the art, the complex permittivity of a material is defined by:

$$\hat{\varepsilon} = \varepsilon' + i\frac{\sigma}{\omega}$$ [Equation 1]

where $\varepsilon'$ is the real part of the permittivity, $\sigma$ is the conductivity of the material, and $\omega$ is the frequency of an applied electric field E. This is relevant as no material is a perfect dielectric—i.e. at some level, there will be some level of conductivity. Thus, the output of a sensor constructed in accordance with the principles of the present invention will signify both the permittivity of the medium and its conductivity. It will be therefore appreciated by those skilled in the art that mention of the term "electrical permittivity" in this description also embraces the complex permittivity of a medium.

FIG. 5B illustrates an embodiment of the present invention that also includes an electrically grounded layer, comprising a grounded conductive sheet 331, beneath electrically active layer 320. This provides electromagnetic shielding of the electrically active layer from stray capacitances originating from beneath the sensor. It will be appreciated by those skilled in the science that reference to electrical "ground" and an element being electrically "grounded" in this description encompass both the case of being physically connected to Earth or to a current carrying body capable of providing a zero-voltage reference level. Thus, the term "ground" as used herein refers to the general case of a body that can be approximated as capable of providing an infinite source of and sink for charge, and can thus absorb an unlimited amount of current without a change in potential of the element connected to it.

FIG. 6

Figure 6:
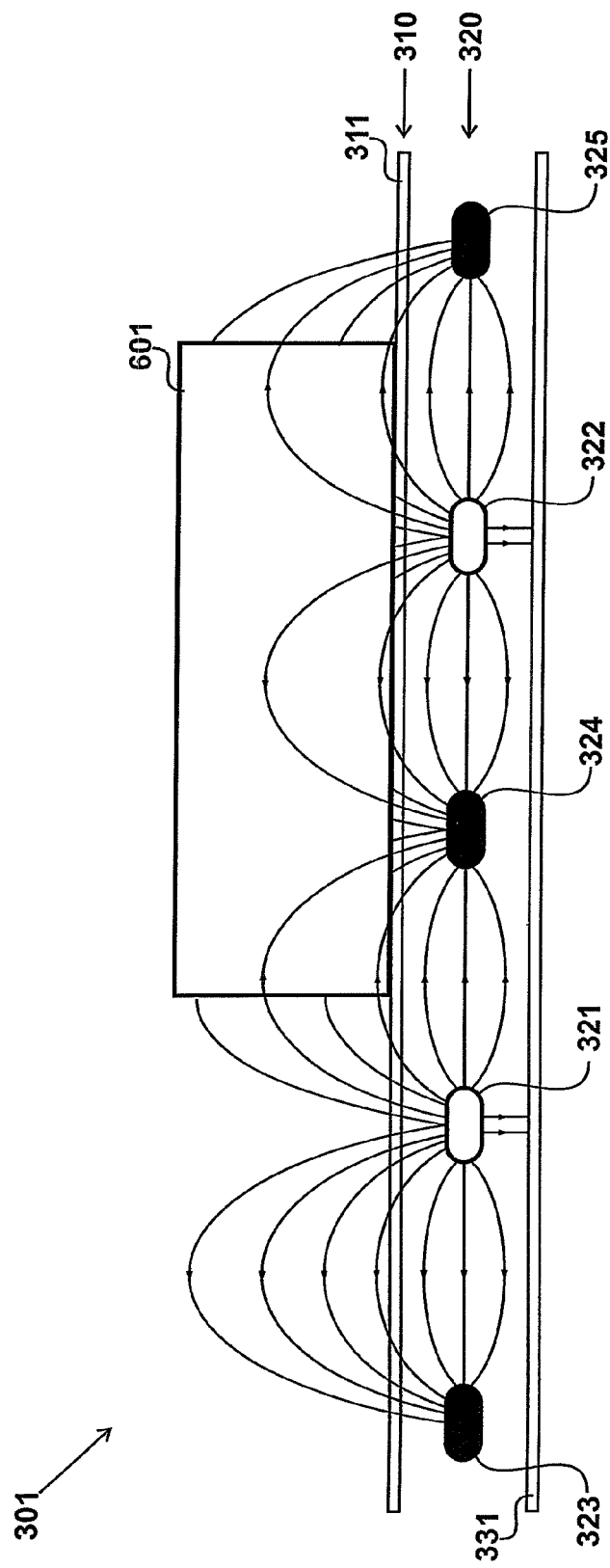
FIG. 6 shows the electric field formed within a portion of sensor array 301 when an object is placed on it.

The electric field formed within a portion of sensor array 301 when an object such as object 601 is placed on the array is shown in cross-sectional view in FIG. 6.

When compared with the air above dielectric material 311, object 601 has a different electric permittivity. In this example, object 601 is a dielectric, and so when it is placed in the electric fields formed by transmitter electrodes 321 and 322, polarization occurs within the object which results in the reduction of the electric field inside. This in turn causes an increase in the degree of capacitance coupling between the transmitter and receiver electrodes, in much the same way as, as will be apparent to those skilled in the science, when a dielectric is inserted into a capacitor. Thus, it will be appreciated that an output signal detected on receiver electrode 323 will differ from that on receiver electrodes 324 and 325, over which the object is present. The output signals can then be used to determine the relative difference in permittivity between air (above receiver electrode 323) and the object (above receiver electrodes 324 and 325). If another type of material, such as a conductor or a semi-conductor were to be placed on the sensor, then changes to the electric field would also occur, resulting in different signals manifesting on the various receiver electrodes.

FIG. 7

Figure 7:
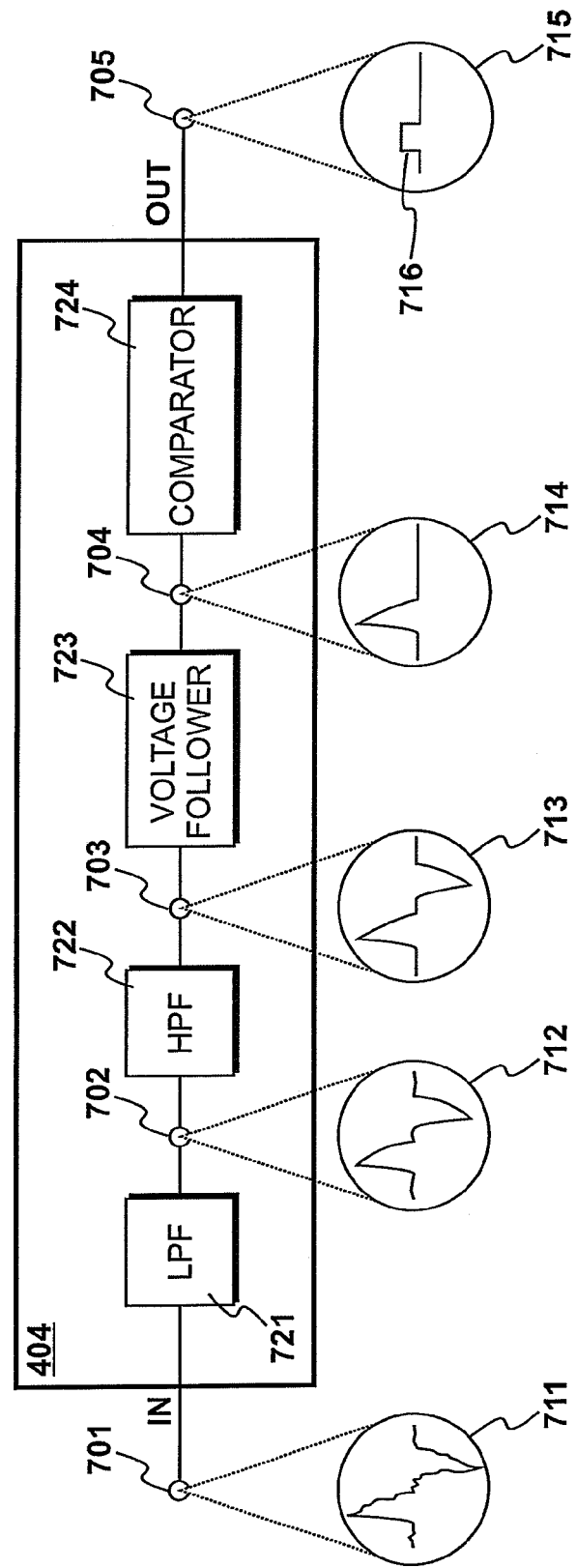
FIG. 7 shows the signal detector used to sample the output signal from a receiver electrode.

The signal detector used to sample the output signal from a receiver electrode is shown in FIG. 7.

Signal detector 406 was previously described with reference to FIG. 4, in that it was arranged to receive at an input terminal a signal from receiver multiplexer 405 and to output a sample signal indicative of the voltage in a receiver electrode.

For the purposes of this example, it is assumed that the sensor array producing a signal is the sensor array shown in FIG. 5B, and, due to the provision of the electrically grounded layer, has not been affected by stray capacitance and other forms of outside electrical interference. The signal produced in a receiver electrode is a voltage that peaks and decays in a positive sense when an increase in voltage is applied to a neighbouring transmitter electrode, and peaks and decays in a negative sense when a decrease in voltage is applied to a neighbouring transmitter electrode. This is due to the changes in the strength of the electric field between the transmitter and the receiver electrodes. These changes cause charge to flow to and from the receiver electrode under the influence of an induced electromotive force, which in turn results in the manifestation of a voltage on the receiver electrode.

Signal detector 406 includes an input terminal 701 at which an example signal 711 multiplexed from a receiver electrode is shown. Signal 711 is conditioned by low pass filter 721 which filters out high frequency components of the signal to give a first filtered signal 712. First filtered signal 712 is then provided to an input 702 of a high pass filter 722 that filters out low frequency components. This filtering gives a second filtered signal 713 that is provided to one input 703 of a voltage follower 723, which is configured to output a signal 714 representing only the positive portion of second filtered signal 713. Voltage follower 703 has an extremely high input impedance and a very low output impedance, and thus serves to avoid crosstalk between the two sides of signal detector 406. The output from voltage follower 723 is provided to an input 704 of a comparator 724 which is configured to compare signal 714 to a threshold voltage. This comparison process produces a comparison signal 715 having a pulse 716 at output 705 whose width in the time domain is equal to the width of signal 714 that exceeds the threshold voltage. Given identical input signals on a neighbouring transmitter electrode, the response of a receiver electrode is always identical in profile. However, the amplitude of the output signal changes in dependence upon the level of capacitive coupling present. The duration of comparison signal 715 is therefore proportional to the amplitude of the voltage developed at the receiver electrode and in turn the electrical permittivity of the volume above the receiver electrode providing the input to the signal detector.

The comparison signals produced by signal detector 406 are sampled by processor 407 by timing their durations with reference to its internal clock. The durations are stored in memory as duration data for further analysis, which can include the application of algorithms that effect interpolation of the data to give much higher spatial resolution.

FIG. 8

Figure 8:
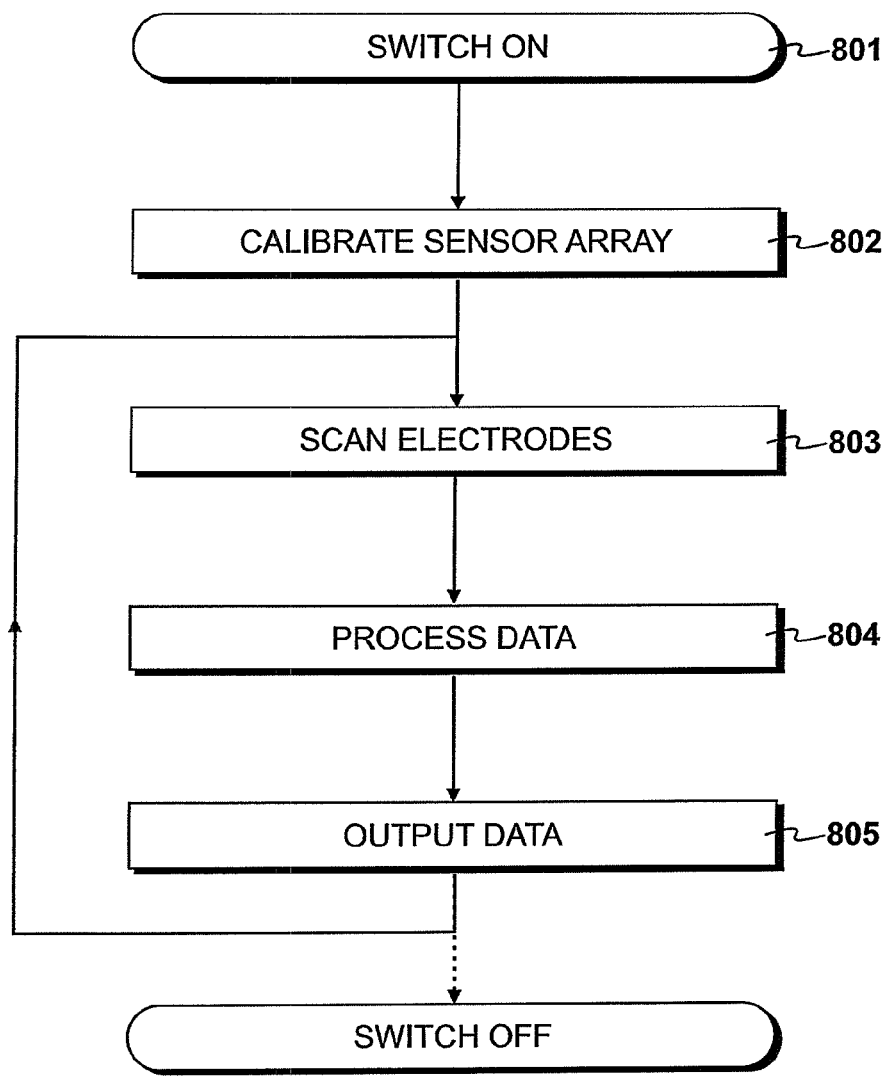
FIG. 8 shows steps carried out to initialise sensor 101.

Steps carried out to initialise sensor 101 by processing device 202 are detailed in FIG. 8.

At step 801, the sensor is switched on, and at step 802 a calibration procedure is run. The calibration procedure is carried out with no object placed on the sensor, and serves to establish reference values for voltages on receiver electrodes. This has the benefit of negating any effect of temperature and humidity, which are capable of affecting the strength of received signals. Alternatively, a user of the sensor could run the calibration procedure with an object in place, if they wish to zero its permittivity values for subsequent readings. At step 803, the sensor array is scanned by transmitting on each transmitter electrode and receiving on each receiver electrode as described previously with reference to FIG. 4. This results in comparison signals being produced by signal detector 406, which are timed by processor 407 to produce duration data.

At step 804, the duration data is outputted at step 805 for further analysis. Control then returns to step 803 where the array is scanned again, or the sensor is switched off.

FIG. 9

Figure 9:
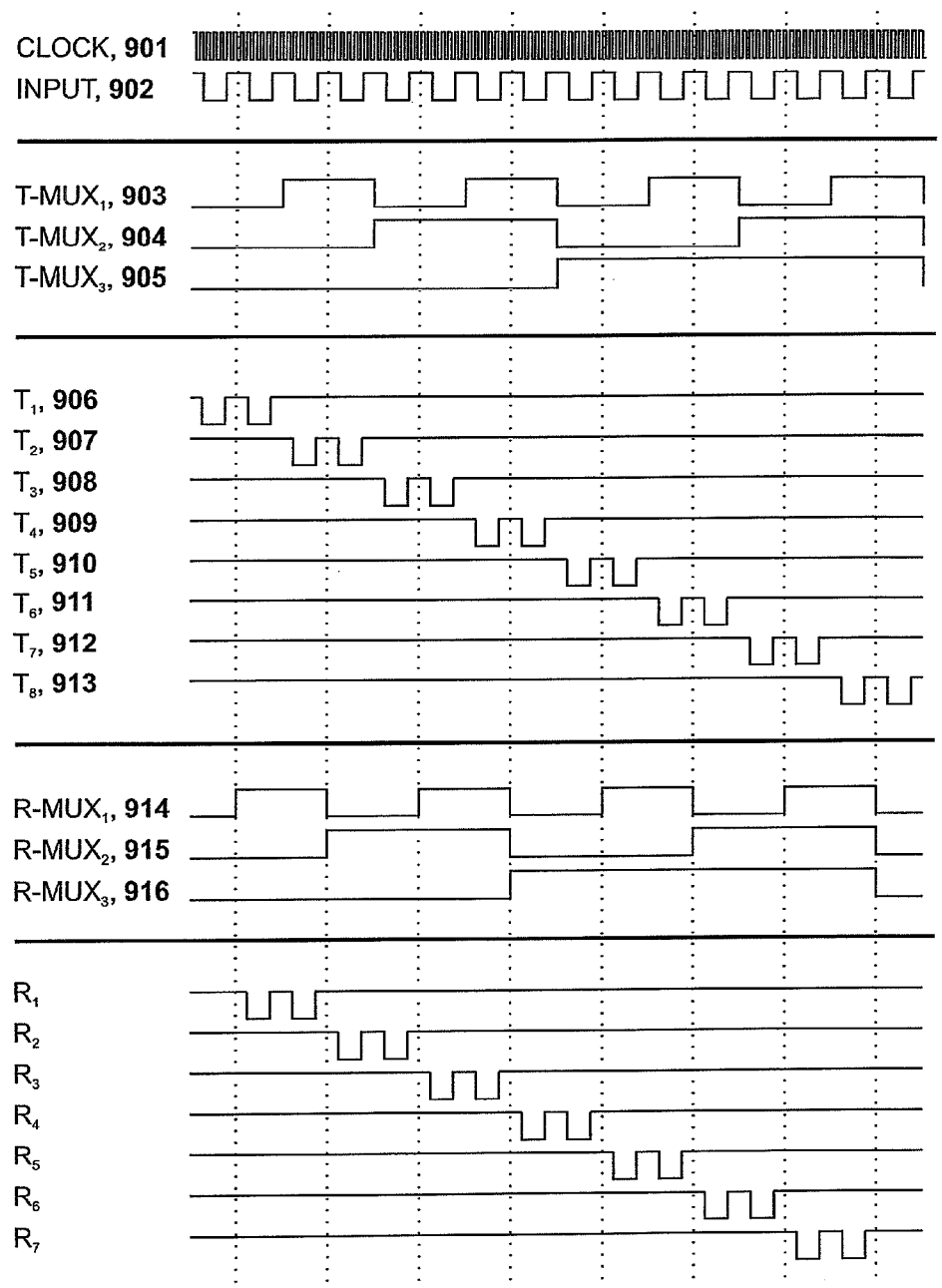
FIG. 9 shows the process of scanning transmitter and receiver electrodes.

The process of scanning transmitter and receiver electrodes in a sensor array in accordance with an aspect of the present invention is shown in the form of a timing diagram in FIG. 9.

A clock signal is shown at 901, and provides a reference signal by which all other timings abide by. In this example, the clock frequency is ten Megahertz, but in other embodiments the frequency is higher or lower depending upon the resolution required. At 902, an input signal produced by signal generator 404 is illustrated and has a frequency of repetition of 2f. In this example, f is some multiple of the clock frequency shown at 901, which in the present embodiment is 1 Kilohertz. Signal generator 404 therefore produces input signals at a frequency of repetition of 2 Kilohertz. As previously described with reference to FIG. 4, transmitter multiplexer 403 is configured to multiplex input signals from signal generator 404 across each transmitter electrode in sensor array 301. For this purpose, it includes three switching channels which are controlled by signals illustrated at 903, 904 and 905. By altering the switching of each channel, it is possible to multiplex input signals across $2^3=8$ channels. The transmitter multiplexer is therefore configured to switch between its outputs in sequence and at a frequency f, which, in keeping with this example, would be at a frequency of 1 Kilohertz. As shown at 906 through 913, this results in two pulses being applied to each transmitter electrode.

The switching of channels in receiver multiplexer 405 to multiplex output signals from each receiver electrode into signal detector 406 is shown at 914, 915 and 916. In a similar fashion to transmitter multiplexer 403, receiver multiplexer is configured so as to switch between input channels in sequence at a frequency f, which in this case is 1 Kilohertz. However, the switching of inputs occurs 180 degrees out of phase with the switching in transmitter multiplexer 403, and so results in two output signals from each receiver electrode being provided to the signal detector. One output signal is derived from a signal transmitted from a transmitter electrode to one side of the receiver electrode, and a second output signal is derived from a signal transmitted from a transmitter electrode to another side of the receiver electrode.

In effect, therefore, each receiver electrode "listens" for capacitive coupling from a transmitter electrode to its left and then a transmitter electrode to its right. This allows the recording of two measurements of the degree of capacitive coupling per receiver electrode. In an embodiment, processing then takes place on the two measurements to effect linear interpolation. More measurements allow processing to take place to effect polynomial interpolation, resulting in more accurate data sets for analysis.

Clearly, in the example shown in the Figures, there are only seven receiver electrodes, and so one of the inputs of receiver multiplexer 405 will be connected to ground such that the measuring device receives zero input when the corresponding channel is selected.

FIG. 10

Figure 10:
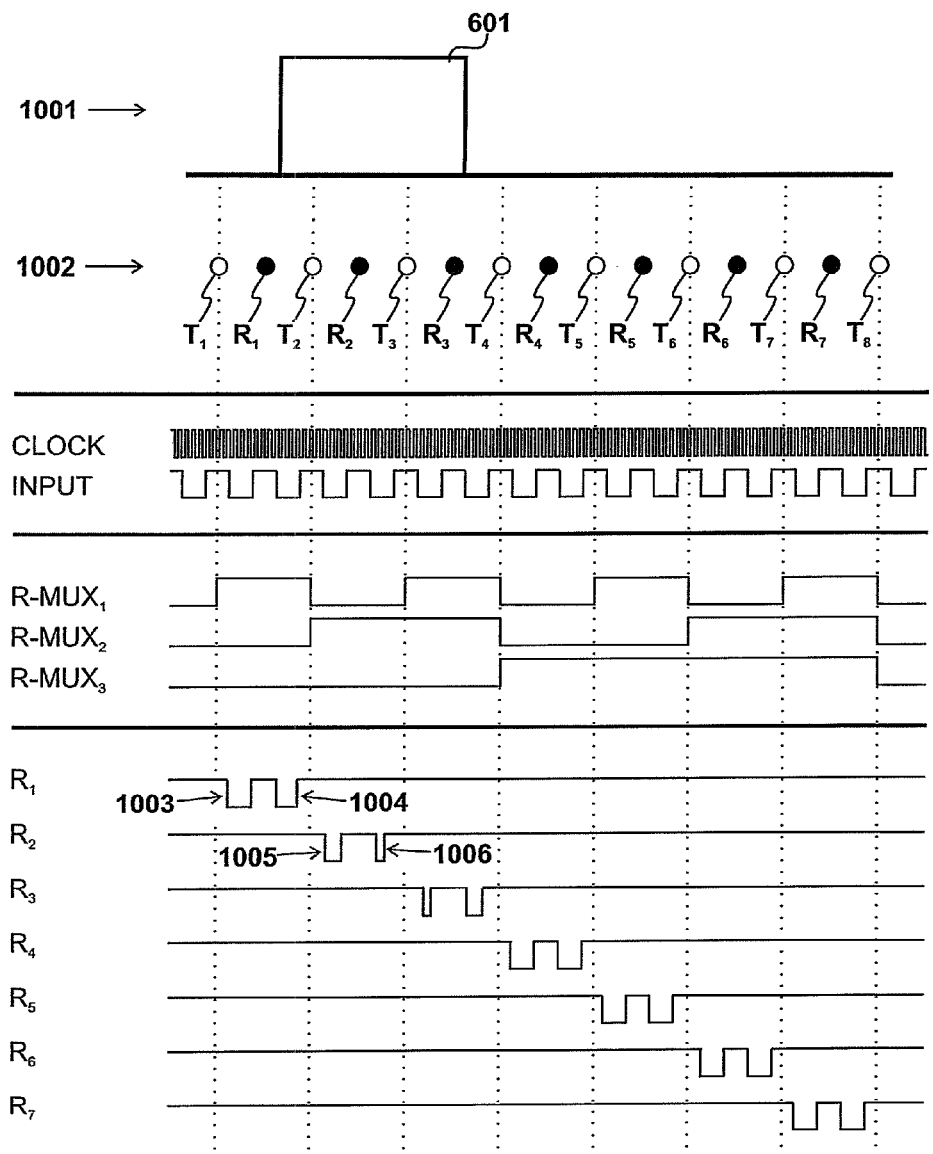
FIG. 10 shows an example of the signals provided to signal detector 406 when an object is placed on sensor array 201.

An example of the signals provided to signal detector 406 when an object, such as object 601, is placed on sensor array 201 is shown in FIG. 10.

The object placed on the sensor array is shown at 1001, with an arrangement of transmitter electrodes (labelled $T_1$ to $T_8$) and receiver electrodes (labelled $R_1$ to $R_7$) illustrated at 1002.

At 1003, the clock signal is illustrated, again running at a frequency of ten Megahertz. Input signals shown at 1004 are produced at a frequency of repetition of ten Kilohertz, and multiplexed across the transmitter electrodes as previously described with reference to FIG. 9. The switching of inputs in receiver multiplexer 405 results in all of the signals formed on the receiver electrodes being provided to signal detector 406. For ease of illustration, the output signals produced by the signal detector are shown for the respective receiver electrode that they originated from, and are labelled $R_1$ to $R_7$.

When considering $R_1$, the output signal produced when an input signal is applied to transmitter electrode $T_1$ is shown at 1003, and the output signal produced when an input signal is applied to transmitter electrode $T_2$ is shown at 1004. As there is no part of the object present between $T_1$ and $R_1$, there is no change to the electric field between $T_1$ and $R_1$, and so the width of measurement signal 1003 is not changed. As there is indeed part of the object present between $R_1$ and $T_2$, there is a reduction in the width of measurement signal 1004. The difference between signals can also be seen at 1005 and 1006, where there is also a clear decrease in the width of the measurement due to reduction of the capacitive coupling between $T_2$ and $R_2$ and $T_3$ and $R_2$. In this embodiment, as the frequency of switching of the multiplexers happens at 8 Kilohertz, and so a total scan of the array occurs at a frequency of 1 Kilohertz.

The duration of each of the output signals produced by signal detector in a single scan is compared with the clock signal to produce duration data corresponding to the positions, which may then be provided to a personal computer (not shown) for later analysis. The processing of the data is carried out to interpolate the data using electrostatic field equations. Given the high clock frequency, a much higher effective resolution is provided than would be apparent simply by inspecting the physical resolution of the transmitter and receiver electrodes.

FIG. 11

Whilst the present invention has thus far been described with reference to an embodiment that senses the electrical permittivity of an object in one direction, a second embodiment provides for sensing in two directions.

Figure 11:
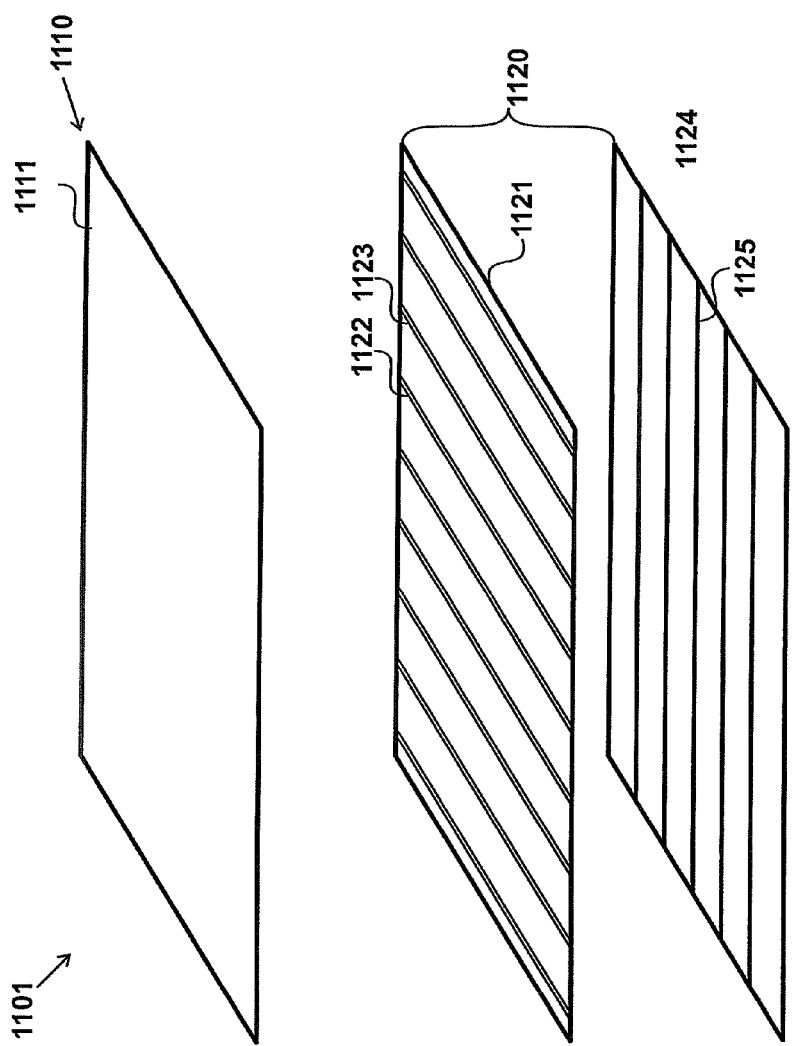
FIG. 11 shows a sensor array 1101 embodying another aspect of the present invention.

An abstraction diagram of the structure of a sensor array in accordance with this second embodiment is therefore shown in FIG. 11. In a similar way to the first embodiment described previously with reference to FIG. 3, a sensor array indicated generally at 1101 comprises two layers: a dielectric layer 1110 and an electrically active layer 1120. Dielectric layer 1110 is substantially the same as dielectric layer 310, and so comprises a dielectric material 1111, which, as described previously, may be transparent or opaque, or flexible or rigid, depending upon the chosen embodiment. Electrically active layer 1120, however, differs in that it includes a first membrane 1121 having a first set of electrodes (such as electrodes 1122 and 1123) and a second membrane 1124 having a second set of electrodes (such as electrode 1125). In this embodiment, the second set of electrodes on second membrane 1122 extend substantially mutually orthogonally to those on first membrane 1121, and, as will be described further with reference to FIG. 13, allows sensor array 1101 to sense the electrical permittivity of an object placed on the sensor in two mutually orthogonal directions. Thus, in this example, the first set of electrodes extend in the x-direction, and the second set of electrodes extend in the y-direction.

In the present embodiment, the first and second set of electrodes are printed using conductive ink on one side only of the two membranes. Thus, the membranes are placed together with their blank sides touching so as to avoid short circuiting. In alternative cases, an insulating material could be placed between the membranes, or each set of transmitter and receiver electrodes could be printed on respective sides of the same membrane in order to reduce costs.

In a similar way to the first embodiment described previously with respect to FIG. 3, first membrane 1121, carrying the first set of electrodes, is, in an example, a flexible dielectric material. In addition, in some embodiments, the membrane is transparent, and again, in some embodiments, the first set of electrodes comprise of substantially transparent conductive ink. In a further example, second membrane 1122, carrying the second set of electrodes, is configured similarly to the aforesaid possible configurations of the first membrane 1121.

FIG. 12

Figure 12:
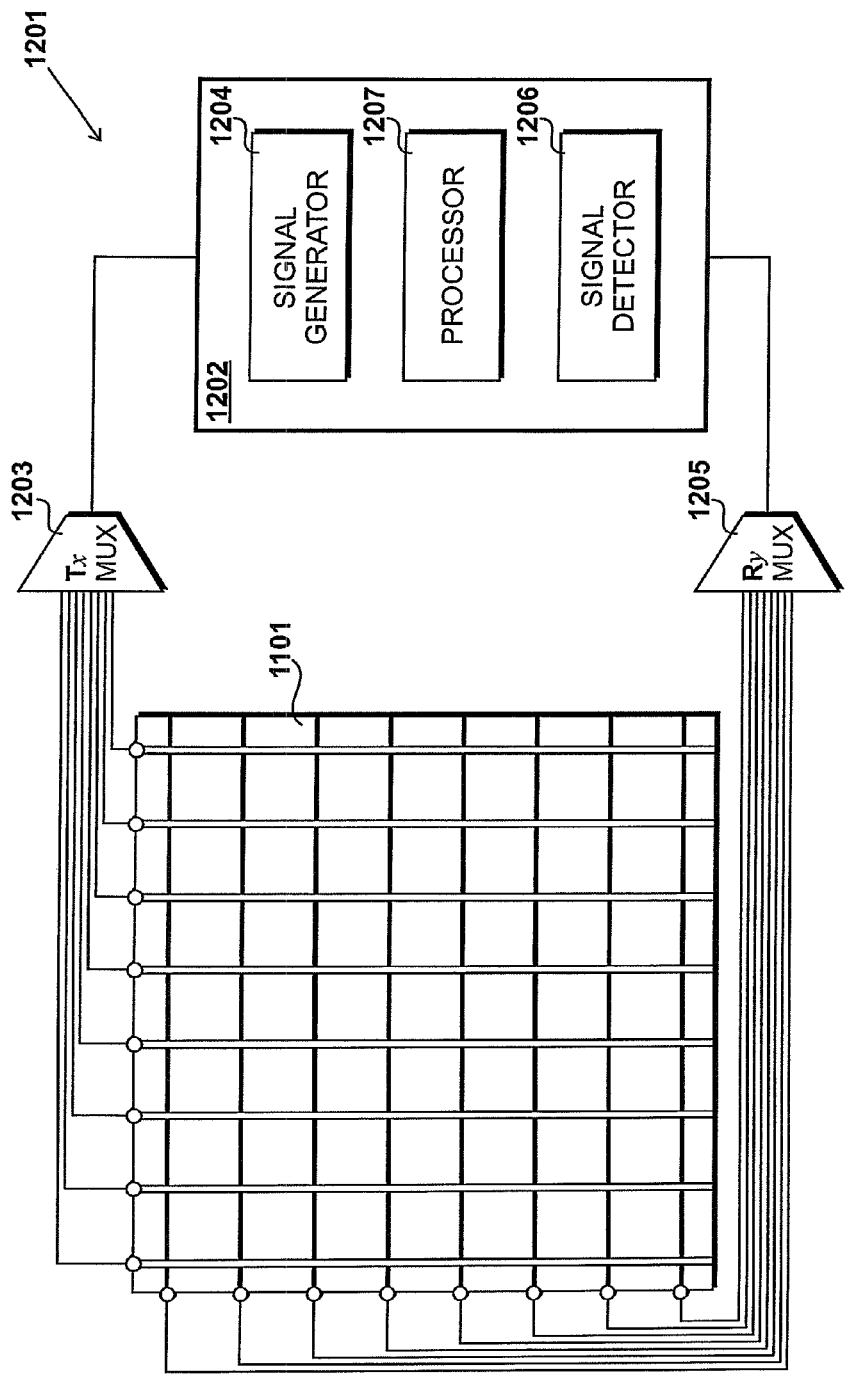
FIG. 12 shows an exemplary arrangement of a sensor 1201 including sensor array 1101.

An exemplary arrangement of a sensor 1201 including sensor array 1101 is shown in FIG. 12.

A processing device 1202 (fulfilling the role of processing device 202) is present, and includes a signal generator 1204 (configured in substantially the same way to signal generator 404), a signal detector 1206 (configured substantially in the same way to signal detector 406) and a processor 1207 (configured substantially in the same way to processor 407).

A transmitter multiplexer 1203 is connected to signal generator 1204 and to the first set of electrodes in sensor array 1101, whilst receiver multiplexer 1205 is connected to the signal detector 1206 and to the second set of electrodes in sensor array 1101.

By configuring transmitter multiplexer 1203 and receiver multiplexer 1205 accordingly, then one input signal from signal generator 202 is applied to each transmitter electrode in sequence whilst signals from one receiver electrode are received. Receiver multiplexer 1205 then switches to the next receiver electrode, and input signals are then applied to each transmitter electrode again. Thus, given an array having eight electrodes in a first set arranged substantially perpendicularly to eight electrodes in a second set, and being provided with input signals having a frequency of repetition $8f$, the transmitter multiplexer switches across each electrode in the first set at a frequency $8f$, and the receiver multiplexer switches between each electrode in the second set at a frequency f. This results in an output signal being produced at each intersection between an electrode in the first set and an electrode in the second set, giving, in this example, sixty-four data points following processing of comparison signals by processor 1207.

FIGS. 13A and 13B

A cross section of sensor array 1101 is shown in FIG. 13A. Sensor array 1101 includes dielectric layer 1110 and electrically active layer 1120. In order to reduce the effect of stray capacitance, an electrically grounded layer 1131 may be provided as shown in this example. As described previously with reference to FIG. 11, the electrically active layer comprises a first set of electrodes arranged substantially perpendicular to a second set of electrodes. However, as FIG. 13A shows only a cross section, only one electrode in the second set, electrode 1125, is shown.

As shown in FIG. 13A, when an input signal is applied to an electrode in the first set, such as transmitter electrode 1122, then along with parallel-plate type capacitance with electrode 1125, there will also be an electric field extending upwards from the side and upper surfaces of electrode 1122. A similar situation occurs between electrode 1123 and electrode 1125.

FIG. 13B illustrates the electric field when viewed from above. It will be noted that the shape of each of the electrodes includes a narrowing at the intersection with other electrodes, thereby reducing parallel-plate type capacitance between overlapping electrodes.

FIGS. 14A and 14B

A cross section of sensor array 1101 is shown in FIG. 14A with an object 1401 placed on the sensor. As described previously with reference to FIG. 6, the presence of the object results in a change to the electric field and therefore the capacitive coupling between electrodes. In this case, it is the capacitance between intersecting electrodes in the first and second electrode set that is altered. As can be seen in FIG. 14B, which is a view from above, the electric field is also altered in the x-y plane. Thus, by providing numerous intersections, such as in the example shown in FIG. 12, it is possible to create a data set indicating the electrical permittivity of the volume above each intersection.

It has been realised by the present applicant that, when dealing with dielectrics on the sensor, by applying Laplace's equation (a special form of Poisson's equation), which states that:

$$\nabla^2 V = 0 \qquad [\text{Equation 2}]$$

or in other words the gradient of the flux of the electric field is zero, then it is possible to exactly interpolate the data to identify the output signal of a notional electrode lying between two real electrodes. In experimental testing, this has greatly improved the resolution of the sensor array down to the scale of micrometers, with greater accuracy available by increasing the clock speed of the processor and thus the precision of the measurement of comparison signals produced by the signal detector.

A similar approach can be taken by applying Poisson's equation, which states that:

$$\nabla^2 V = -\rho/\in_0 \qquad [\text{Equation 3}]$$

in the case where conductors or semi-conductors are place on the sensor.

FIG. 15

Figure 15:
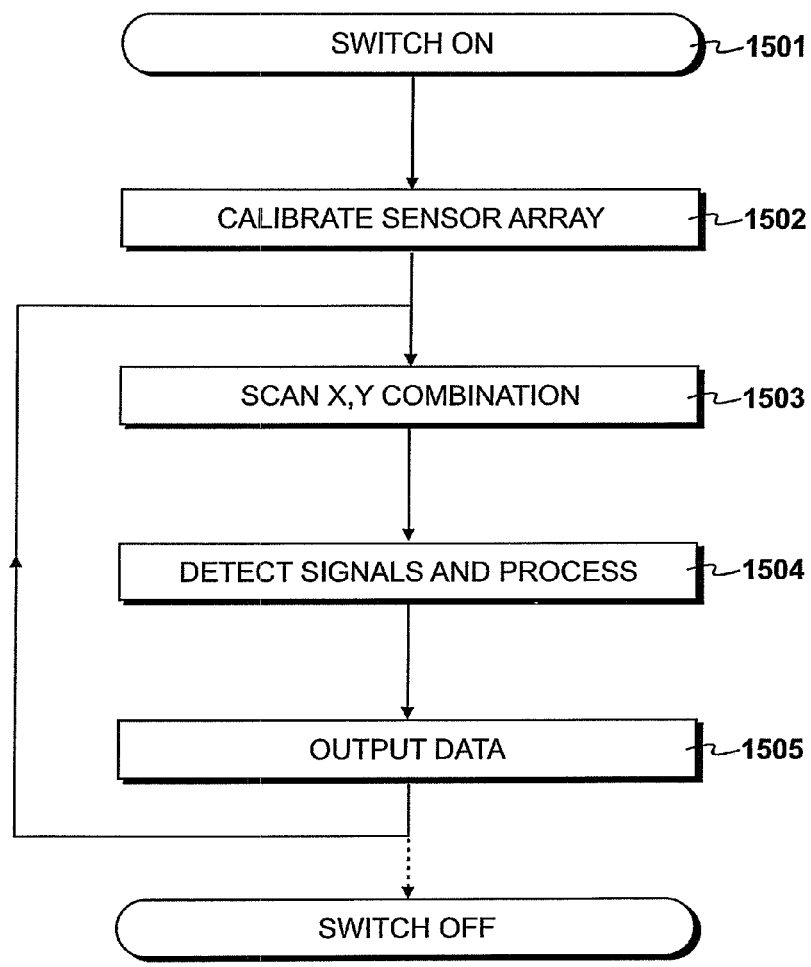
FIG. 15 shows steps carried out to initialise sensor 1201 including sensor array 1101.

Steps carried out to initialise sensor 1201 including sensor array 1101 are detailed in FIG. 15.

At step 1501, the sensor is switched on, and at step 1502 a calibration procedure is run. The calibration procedure is carried out with no object placed on the sensor, and serves to establish reference values for output signals from the second set of electrodes. This has the benefit of negating any effect of temperature and humidity, which are capable of affecting the strength of received signals. Alternatively, a user of the sensor could run the calibration procedure with an object in place, if they wish to zero its permittivity values for subsequent readings.

At step 1503, the sensor array is scanned by applying input signals to electrodes in the first set (extending in the x-direction) and detecting output signals from electrodes in the second set (extending in the y-direction). This procedure will be described further with reference to FIG. 16. At step 1505, the comparison signal produced by signal detector 1206 is processed by processor 1207, and the duration data produced is outputted at step 1505 for further analysis. Algorithms are then used to effect interpolation of the data, using the previously described principles of applying Laplace's equation and Poisson's equations to dielectrics and conductors/semiconductors respectively. Control then returns to step 1503 where the array is scanned again, or the sensor is switched off.

FIG. 16

Figure 16:
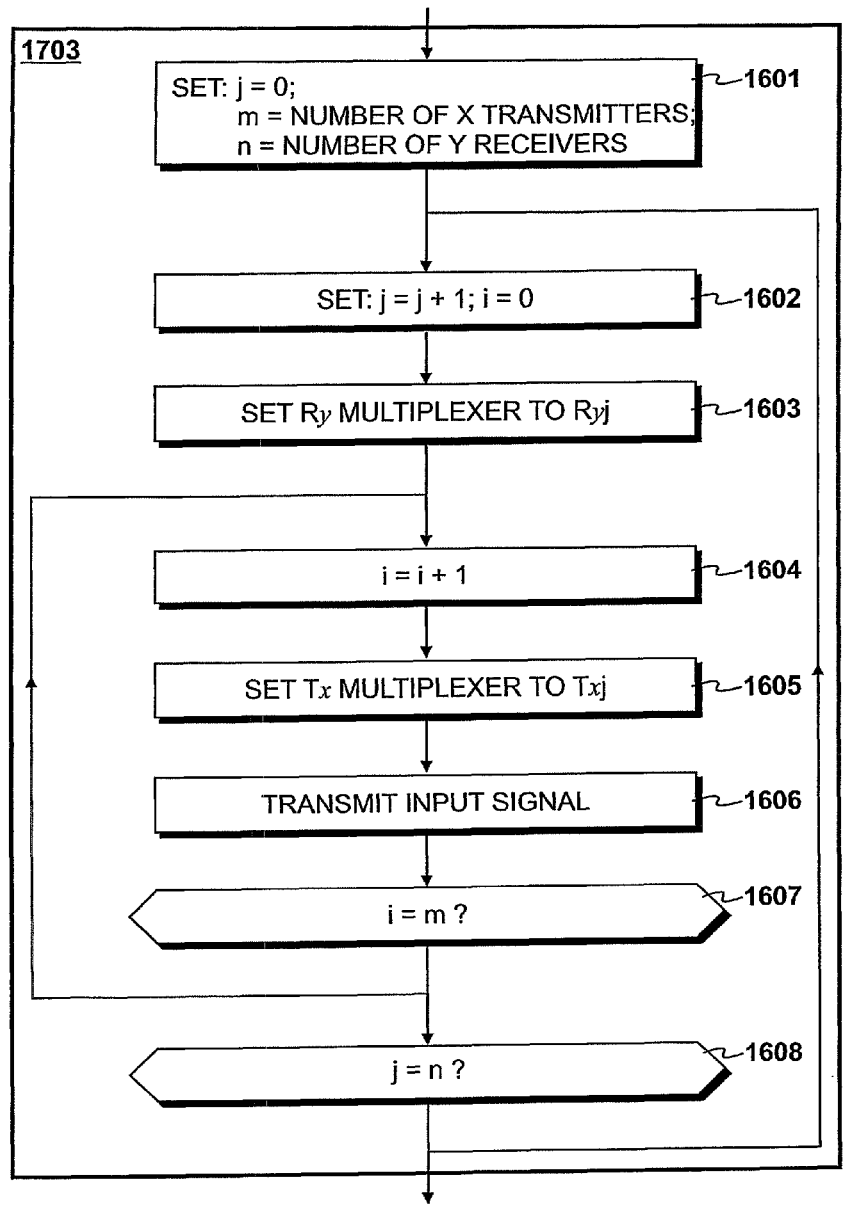
FIG. 16 shows steps carried out to effect switching between the outputs of transmitter multiplexer 1203 and the inputs of receiver multiplexer 1205.

Steps carried out to effect switching between the outputs of transmitter multiplexer 1203 and the inputs of receiver multiplexer 1205 are detailed in FIG. 16.

At step 1601, the iterative variable j is set to equal 0. Constants m and n are set to be the number of electrodes in the first set and the number of electrodes in the second set, respectively.

At step 1602, the variable j is set to equal j+1, and an iterative variable i is set to equal zero. At step 1603, receiver multiplexer 1205 is set to receive on the jth input; so in the first case, the first input. At step 1604, the variable i is set to equal i+1, and at step 1605 transmitter multiplexer 1203 is set to output on the ith output; so in the first case, the first output. At step 1606, signal generator 1204 produces an input signal which is transmitted on the selected transmitter electrode. At step 1607, a question is asked as to whether variable i=m. If this question is answered in the negative, then control returns to step 1604 where an input signal is transmitted on the next electrode in the first set. If the question asked at step 1607 is answered in the affirmative, then a further question is asked at step 1608 as to whether the variable kn. If this question as answered in the negative, the control returns to step 1602 where j is iterated and the next electrode in the second set is selected. If the questions asked at step 1608 is answered in the affirmative, then step 1503 is complete. The effect of this transmission is to sample electrical permittivity in the volume all points where electrodes in the first set and electrodes in the second set intersect, thereby creating a matrix of duration data having dimension m by n.

What we claim is:

1. A method comprising sensing the electrical permittivity of an object, comprising steps of:
   providing a sensor array including:
      a dielectric layer that presents a surface defining the base of a volume in which a test object may be placed, and
      an electrically active layer beneath said dielectric layer, comprising a first set of electrodes that extend in a first direction and a second set of electrodes that extend in a second direction that is perpendicular to said first direction, and each one of said first set of electrodes intersects each one of said second set of electrodes;
   placing a test object in said volume;
   producing and applying an input signal to a first electrode in said first set of electrodes, thereby generating an electric field that extends outside of said sensor array and into said volume; and
   detecting output signals produced in each one of said second set of electrodes that intersect said first electrode, said output signals being caused by capacitive coupling between said first electrode and each one of said second set of electrodes, and said output signals being indicative of the electrical permittivity in of the section of said volume above the intersection of said first electrode and each one of said second set of electrodes.

2. The method of claim 1, further comprising a step of providing an electrically grounded layer beneath the electrically active layer, wherein said electrically grounded layer is configured to electromagnetically shield the electrically active layer.

3. The method of claim 1, wherein said electrically active layer comprises a membrane on to which the first set of electrodes has been printed using conductive ink.

4. The method of claim 3, wherein said membrane comprises of a flexible dielectric material.

5. The method of claim 3, wherein said membrane comprises of a substantially transparent material.

6. The method of claim 5, wherein the conductive ink making up the first set of electrodes is substantially transparent conductive ink.

7. The method of claim 1, wherein said input signal is a square wave, and said method further comprises the step of processing the output signal by:
   receiving said output signal;
   comparing the output signal to a reference voltage to produce a comparison signal having a square profile of width proportional to the electrical permittivity in the volume above the intersection of said first electrode and said second electrode;

measuring the duration of said comparison signal to produce duration data corresponding to its originating electrode.

8. The method of claim 1, further comprising repeating the producing and detecting steps until input signals have been applied to each one of said first set of electrodes.

9. A sensor configured to sense the electrical permittivity of an object placed thereon, said sensor including:
   a dielectric layer that presents a surface defining the base of a volume in which a test object may be placed; and
   an electrically active layer beneath said dielectric layer, comprising a first set of electrodes that extend in a first direction and a second set of electrodes that extend in a second direction that is perpendicular to said first direction, and each one of said first set of electrodes intersects each one of said second set of electrodes;
   a signal generator configured to apply a signal to a first electrode in said first set of electrodes, thereby generating an electric field that extends outside of said sensor array and into said volume;
   a signal detector configured to detect output signals in each one of said second set of electrodes that intersect said first electrode, said output signals being caused by capacitive coupling between said first electrode and each one of said second set of second electrode, and said output signals being indicative of the electrical permittivity in the volume above the intersection of said first electrode and each one of said second set of electrodes; and
   a processor configured to determine the electrical permittivity of the section of said volume above the first electrode based on said output signals in each one of said second set of electrodes.

10. The sensor of claim 9, further comprising an electrically grounded layer beneath the electrically active layer, wherein said electrically grounded layer is configured to electromagnetically shield the electrically active layer.

11. The sensor of claim 9, wherein said electrically active layer includes a membrane comprising of a substantially transparent material.

12. The sensor of claim 9, wherein:
   said signal generator is configured to produce an input signal that is a square wave;
   said signal detector is configured to compare the output signal from the second electrode to a reference voltage to produce a comparison signal having a square profile of width proportional to the electrical permittivity in the volume above the intersection of said first electrode and said second electrode; and
   said processor includes a clock, and is configured to measure the duration of said comparison signal using said clock, thereby producing duration data corresponding to its originating electrode.

13. The sensor of claim 9, wherein said signal generator is further configured to apply input signals to each one of the electrodes in the first set of electrodes, until output signals have been received at the intersection of each one of said first set of electrodes and each one of said second set of electrodes.

14. The sensor of claim 9, wherein said signal detector comprises a radio transmitter and said processor comprises a radio receiver, and said signal detector is configured to convey an output signal to said processor using said radio transmitter.

15. A sensor configured to sense the electrical permittivity of an object placed thereon, said sensor including:
   a dielectric layer that presents a surface defining the base of a volume in which a test object may be placed; and
   a first electrically active layer beneath said dielectric layer, comprising a first electrode set having parallel alternating transmitter electrodes and receiver electrodes that extend in a first direction;
   a signal generator configured to apply a signal to a first transmitter electrode that causes the generation of an electric field that extends outside of said sensor and into said volume at a degree determined by the magnitude of the applied voltage;
   a signal detector configured to detect an output signal in a first receiver electrode caused by capacitive coupling with said first transmitter electrode, and said output signal being indicative of the electrical permittivity in the volume above said first receiver electrode; and
   a processor configured to determine the electrical permittivity of the section of said volume above the first receiver electrode based on said output signal in said first receiver electrode.

16. The sensor of claim 15, further comprising an electrically grounded layer beneath the first electrically active layer, wherein said electrically grounded layer is configured to electromagnetically shield the first electrically active layer.

17. The sensor of claim 15, wherein:
   said signal generator is configured to produce an input signal that is a square wave;
   said signal detector is configured to compare the output signal from the second electrode to a reference voltage to produce a comparison signal having a square profile of width proportional to the electrical permittivity in the volume above said first receiver electrode; and
   said processor includes a clock, and is configured to measure the duration of said comparison signal using said clock, thereby producing duration data.

18. The sensor of claim 17, further comprising a transmitter multiplexer connected to each one of the transmitter electrodes in the first electrode set, and wherein said signal generator generates input signals at a frequency of repetition of 2f, and said transmitter multiplexer is configured to multiplex said input signals across each one of said transmitter electrodes in sequence at a frequency f.

19. The sensor of claim 17, further comprising a receiver multiplexer connected to each one of the receiver electrodes in the first electrode set, and wherein said receiver multiplexer is configured to multiplex output signals from said receiver electrodes into said signal detector at a frequency f and 180 degrees out of phase with the multiplexing of said input signals.

20. The sensor of claim 15, wherein said signal detector comprises a radio transmitter and said processor comprises a radio receiver, and said signal detector is configured to convey an output signal to said processor using said radio transmitter.

* * * * *